United States Patent
Zelenev et al.

(10) Patent No.: US 9,200,192 B2
(45) Date of Patent: Dec. 1, 2015

(54) COMPOSITIONS AND METHODS FOR ENHANCEMENT OF PRODUCTION OF LIQUID AND GASEOUS HYDROCARBONS

(71) Applicant: CESI Chemical, Inc., Houston, TX (US)

(72) Inventors: Andrei Zelenev, Spring, TX (US); Lakia M. Champagne, The Woodlands, TX (US); Bill Zhou, The Woodlands, TX (US); Nathan L. Lett, Cypress, TX (US); Keith Ingram Dismuke, Katy, TX (US); Glenn S. Penny, Lakewood, CO (US)

(73) Assignee: CESI Chemical, Inc., Houston, TX (US)

( * ) Notice: Subject to any disclaimer, the term of this patent is extended or adjusted under 35 U.S.C. 154(b) by 303 days.

(21) Appl. No.: 13/889,709

(22) Filed: May 8, 2013

(65) Prior Publication Data

US 2014/0299325 A1  Oct. 9, 2014

Related U.S. Application Data

(60) Provisional application No. 61/644,419, filed on May 8, 2012.

(51) Int. Cl.
| | |
|---|---|
| *E21B 43/16* | (2006.01) |
| *C09K 8/60* | (2006.01) |
| *E21B 43/30* | (2006.01) |
| *C09K 8/584* | (2006.01) |

(52) U.S. Cl.
CPC ............. *C09K 8/602* (2013.01); *C09K 8/584* (2013.01); *E21B 43/30* (2013.01)

(58) Field of Classification Search
CPC .......... E21B 43/12; E21B 43/16; E21B 43/25
See application file for complete search history.

(56) References Cited

U.S. PATENT DOCUMENTS

| | | | |
|---|---|---|---|
| 3,060,210 A | 4/1961 | De Groote |
| 3,047,062 A | 7/1962 | Meadors |
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,005,020 A | 1/1977 | McCormick |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |

(Continued)

FOREIGN PATENT DOCUMENTS

| | | |
|---|---|---|
| CN | 102127414 | 7/2011 |
| CN | 102277143 | 12/2011 |

(Continued)

OTHER PUBLICATIONS

International Search Report and Written Opinion dated Oct. 21, 2014 for Application No. PCT/US2014/37334.
[No Author Listed], The HLB system: a time-saving guide to emulsifier selection. ICI Americas Inc. 1976. 22 pages.
ADM, Evolution Chemicals E5789-117 Description. Jun. 2014.
Brost et al., Surfactants assist water-in-oil monitoring by fluroescence. World Oil. Oct. 2008;229(10).
Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.
Crafton et al., Micro-emulsion effectiveness for twenty four wells, eastern green river, wyoming. 2009 SPE Rocky Mountain Petroleum Technology Conference. Denver, Colorado, USA, Apr. 14-16, 2009. SPE-123280. 13 pages.
Haw, The HLB system: a time saving guide to surfactant selection. Presentation to the Midwest chapter of the society of cosmetic chemists. Uniqema. Mar. 9, 2004. 39 slides.

(Continued)

*Primary Examiner* — Catherine Loikith
(74) *Attorney, Agent, or Firm* — Wolf, Greenfield & Sacks, P.C.

(57) ABSTRACT

A well treatment composition is well-designed for the simultaneous enhancement of the production of both liquid and gaseous hydrocarbons from the same reservoir on a non-selective basis. The well treatment composition includes a first surfactant and a second surfactant, wherein the second surfactant is selected from the group consisting of ethoxylated alkylene amines, ethoxylated alkyl amines, propoxylated alkylene amines, propoxylated alkyl amines, ethoxylated-propoxylated alkylene amines and ethoxylated-propoxylated alkyl amines. The well treatment composition also includes a first solvent, a second solvent and water. Methods for using the well treatment composition include the steps of emplacing the well treatment composition into wells having high and low gas-to-oil ratios.

18 Claims, No Drawings

(56) References Cited

U.S. PATENT DOCUMENTS

| | | |
|---|---|---|
| 5,784,386 A | 7/1998 | Norris |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | VonKrosigk et al. |
| 7,021,378 B2 | 4/2006 | Prukop |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0166472 A1 | 9/2003 | Pursley et al. |
| 2003/0232095 A1 | 12/2003 | Garti et al. |
| 2005/0209107 A1 | 9/2005 | Pursley et al. |
| 2006/0014648 A1 | 1/2006 | Milson et al. |
| 2006/0211593 A1 | 9/2006 | Smith et al. |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0137432 A1 | 5/2009 | Sullivan et al. |
| 2009/0159288 A1 | 6/2009 | Horvath Szabo et al. |
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2010/0022421 A1 | 1/2010 | Gutierrez et al. |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho O et al. |
| 2010/0307757 A1 | 12/2010 | Blow et al. |

(56) References Cited

U.S. PATENT DOCUMENTS

| | | |
|---|---|---|
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0190174 A1 | 8/2011 | Weerasooriya et al. |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0035085 A1 | 2/2012 | Parnell et al. |
| 2012/0071366 A1 | 3/2012 | Falana et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0292121 A1 | 11/2013 | Penny et al. |
| 2014/0005079 A1 | 1/2014 | Dahanayake et al. |
| 2014/0110344 A1 | 4/2014 | Hoag et al. |
| 2014/0202700 A1 | 7/2014 | Blair |
| 2014/0262261 A1 | 9/2014 | Hill et al. |
| 2014/0262274 A1 | 9/2014 | Dismuke et al. |
| 2014/0262288 A1 | 9/2014 | Penny et al. |
| 2014/0274817 A1 | 9/2014 | Hill et al. |
| 2014/0274822 A1 | 9/2014 | Dismuke et al. |
| 2014/0284053 A1 | 9/2014 | Germack et al. |
| 2014/0284057 A1 | 9/2014 | Champagne et al. |
| 2014/0332212 A1 | 11/2014 | Ayers et al. |
| 2014/0338911 A1 | 11/2014 | Dismuke et al. |
| 2014/0367107 A1 | 12/2014 | Hill et al. |
| 2014/0371115 A1 | 12/2014 | Hill et al. |
| 2015/0053404 A1 | 2/2015 | Penny et al. |

FOREIGN PATENT DOCUMENTS

| | | |
|---|---|---|
| CN | 103614128 | 3/2014 |
| CN | 103642477 | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| WO | WO 99/49182 | 9/1999 |
| WO | WO 2005/048706 | 6/2005 |
| WO | WO 2007/011475 | 1/2007 |
| WO | WO 2012/158645 | 11/2012 |

OTHER PUBLICATIONS

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

COMPOSITIONS AND METHODS FOR ENHANCEMENT OF PRODUCTION OF LIQUID AND GASEOUS HYDROCARBONS

RELATED APPLICATIONS

This application claims the benefit of U.S. Provisional Patent Application Ser. No. 61/644,419 entitled COMPOSITIONS AND METHODS FOR ENHANCEMENT OF PRODUCTION OF LIQUID AND GASEOUS HYDROCARBONS, filed May 8, 2013, the disclosure of which is herein incorporated by reference.

FIELD OF THE INVENTION

The present invention generally relates to the production of petroleum and more particularly to compositions and processes for improving the recovery of liquid and gaseous forms of petroleum from a subterranean geological formation.

BACKGROUND OF THE INVENTION

For many years, petroleum has been recovered from subterranean reservoirs through the use of drilled wells and production equipment. Petroleum hydrocarbons may be produced in a variety of forms, including liquid crude oil, natural gas and light condensates. To enhance the recovery of petroleum, a number of technologies have been developed. Common well stimulation techniques include hydraulic fracturing, water flooding and acidizing operations. Although liquid and gaseous products are typically encountered together, it may be economically desirable to enhance the production of one form of hydrocarbons over another. For example, economic factors may encourage the shift from a predominantly gas-focused production to a production that favors liquid crude oil. Because crude oil and natural gas have very different physical properties, and thus move differently through the porous media of the subterranean formation, the chemicals used for stimulating the well for the purpose of enhancing gas production may not work as effectively in enhancing oil production. As a result, prior art well stimulation and enhancement products have been formulated to recover a particular form of hydrocarbon, i.e., natural gas or liquid crude oil.

To permit the production of multiple forms of hydrocarbons from a given reservoir, well operators are required to use and stock multiple chemicals for treating the same well. Such practice also often requires additional equipment for handling multiple types of chemicals. The use of multiple treatment chemicals increases the cost and complexity of operating the well. Therefore, having a single stimulation product that enhances fluid recovery of multiple forms of hydrocarbons is desirable. It is to these and other objects that the present invention is directed.

SUMMARY OF THE INVENTION

In a preferred embodiment, the present invention includes a well treatment composition that is suitable for the simultaneous enhancement of the production of both liquid and gaseous hydrocarbons from the same reservoir on a non-selective basis. In a specific embodiment, the method provides for increasing the production of oil from a first well having a high gas-to-oil ratio and the production of gas from a second well having a low gas-to-oil ration. The method preferably includes the steps of providing a complex nanofluid additive, emplacing the complex nanofluid additive into the first well and emplacing the same complex nanofluid additive into the second well.

In another aspect, the novel well treatment composition includes a first surfactant and a second surfactant, wherein the second surfactant is selected from the group consisting of ethoxylated alkylene amines, ethoxylated alkyl amines, propoxylated alkylene amines, propoxylated alkyl amines, ethoxylated-propoxylated alkylene amines and ethoxylated-propoxylated alkyl amines. The well treatment composition also includes a first solvent, a second solvent and water. The first solvent is preferably suspended as an internal phase with an external phase created by the water by the first and second surfactants.

DETAILED DESCRIPTION OF PREFERRED EMBODIMENTS

In a preferred embodiment, the present invention includes a well treatment composition that is suitable for the simultaneous enhancement of the production of both liquid and gaseous hydrocarbons from the same reservoir on a non-selective basis. In this way, formulations of the preferred embodiments can be used to improve the recovery of liquid and gaseous hydrocarbons during a single treatment operation. The compositions of the preferred embodiments can be used to treat predominantly oil-producing wells to achieve production of gas at commercially viable rates, and to treat predominantly gas-producing wells to achieve production of oil at commercially viable rates.

In preferred embodiments, the complex nanofluid additives of the present invention include: (i) a first surfactant; (ii) a second surfactant, where the second surfactant includes at least one ethoxylated/propoxylated alkylene or alkyl amine surfactant; (iii) one or more solvents with limited solubility in water; (iv) one or more co-solvents; and (v) water. The inventive well treatment additive is characterized as a complex nanofluid that includes at least two normally immiscible solvents stabilized by one or more selected surfactants. In a preferred embodiment, the complex nanofluid includes an internal phase hydrocarbon-based organic solvent distributed in an aqueous external phase.

Preferred conventional surfactants include mixtures of ethoxylated vegetable oils and ethoxylated alcohols. In a more particularly preferred embodiment, the selected surfactant or surfactant mixture has a hydrophile-lipophile balance (HLB) value of between 8 and 18. In a particularly preferred embodiment, the surfactant component is an ethoxylated alcohol. In a more preferred embodiment, the surfactant component is an ethoxylated C8-C18 alcohol. In a still more preferred embodiment, the surfactant component is an ethoxylated C8-C18 alcohol with 5-20 moles of ethylene oxide (EO). In a particularly preferred embodiment, the surfactant component is an ethoxylated vegetable oil. U.S. Pat. No. 7,380,606 issued to Pursley, et. al on Jun. 3, 2008 entitled "Composition and Process for Well Cleaning," which is incorporated herein by reference, discloses several surfactants that function as the surfactant component of the complex nanofluid additive. In certain applications, it may be desirable for the surfactant component to include a mixture of different surfactants and surfactant packages. A particularly preferred surfactant package includes C8-C18 linear alcohol alcoxylates, midrange primary, secondary and tertiary alcohols with between 1 and 10 carbon atoms, C2-C10 glycols, and can also include between 5-30 wt % water. Additionally, the surfactant package can include an ethoxylated vegetable oil.

The second surfactant component is preferably an amine-based surfactant selected from the group consisting of ethoxylated alkylene amines, ethoxylated alkyl amines, propoxylated alkylene amines, propoxylated alkyl amines, ethoxylated-propoxylated alkylene amines and ethoxylated-propoxylated alkyl amines. The ethoxylated/propoxylated alkylene or alkyl amine surfactant component preferably includes more than one nitrogen atom per molecule. Suitable amines include ethylenediaminealcoxylate and diethylenetriaminealcoxylate.

Preferred solvents include organic solvents and more particularly, citrus terpenes. D-limonene provides a suitable and desirable solvent that is normally immiscible in water.

The co-solvent component of the complex nanofluid additive may include a short-chain alcohol having a linear or branched chain with less than about 6 carbon atoms. The co-solvent component may further include glycols and mutual solvents or mixtures of thereof. Unlimited examples of suitable alcohols and glycols include methanol, ethanol, 1-propanol, 2-propanol, isomeric butanols, ethylene glycol, triethlyne glycol, propylene glycol, ethylene glycol monobutyl ether.

Particularly preferred embodiments contain from about 5% to about 40% by weight water, from about 0.05 to about 20% by weight solvent and from about 30% to about 75% by weight of nonionic surfactant mixture, in which a first surfactant is a surfactant with a hydrophile-lipophile balance (HLB) greater than 7, and a second surfactant is an ethoxylated-propoxylated alkylene or alkyl amine with more than one nitrogen atom. In a more particularly preferred embodiment, the amine surfactant component is present in a weight ratio to other surfactants from about 0.01 to about 5 and comprises less than 50% of the total additive formulation.

Additives of the preferred embodiments may also contain from about 10% to about 30% by weight of co-solvents. Additives prepared in accordance with preferred embodiments present a colloidal system with droplets having the mean diameter of less than 200 nm when diluted with an aqueous carrier fluid in a ratio from about 1:10000 to about 1:10. In a particularly preferred embodiment, the solvent to water weight ratio is less than about 2.

The preferred embodiments of the complex nanofluid additives can be prepared by mixing individual components or in-situ by diluting solvent-surfactant blends with a selected carrier fluid, fracturing fluid or acidizing fluid in a batch-tank or on-the-fly during the treatment operation.

The following provides a description of laboratory investigations used to establish the efficacy of the inventive complex nanofluid additives. These experiments included an analysis of the effectiveness of the additives on oil-brine displacement and gas-brine displacement. The complex nanofluid additives of the preferred embodiments were compared against prior-art reference additives.

For the oil-brine displacement experiments, a 25 cm long, 2.5 cm diameter capped glass chromatography column was packed with 77 grams of 100 mesh sand. The column was left open on one end and a PTFE insert containing a recessed bottom, 3.2 mm diameter outlet, and nipple was placed into the other end. Prior to placing the insert into the column, a 3 cm diameter filter paper disc (Whatman, #40) was pressed firmly into the recessed bottom of the insert to prevent leakage of 100 mesh sand. A 2" piece of vinyl tubing was placed onto the nipple of the insert and a clamp was fixed in place on the tubing prior to packing. The columns were gravity-packed by pouring approximately 25 grams of the brine (or brine with chemical treatment) into the column followed by a slow, continuous addition of sand.

After the last portion of sand had been added and was allowed to settle, the excess of brine was removed from the column so that the level of liquid exactly matched the level of the sand. Pore volume in the packed column was calculated as the difference in mass of fluid prior to column packing and after the column had been packed. Three additional pore volumes of brine were passed through the column. After the last pore volume was passed, the level of brine was adjusted exactly to the level of sand bed. Light condensate oil was then added on the top of sand bed to form the 5 cm oil column above the bed. Additional oil was placed into a separatory funnel with a side arm open to an atmosphere.

Once the setup was assembled, the clamp was released from the tubing, and timer was started. Throughout the experiment the level of oil was monitored and kept constant at a 5 cm mark above the bed. Oil was added from the separatory funnel as necessary, to ensure this constant level of head in the column. Portions of effluent coming from the column were collected into plastic beakers over a measured time intervals. The amount of fluid was monitored. When both brine and oil were produced from the column, they were separated with a syringe and weighed separately. The experiment was conducted for 3 hours at which the steady-state conditions were typically reached. The cumulative % or aqueous fluid displaced from the column over 120 minute (2 hour) time period was determined.

For the gas-brine displacement experiments, a 51 cm long, 2.5 cm in diameter capped glass chromatography column was filled with approximately 410±20 g of 20/40 mesh Ottawa sand and a brine (or brine containing chemical treatment). To ensure uniform packing, small amounts of proppant were interchanged with small volumes of liquid. Periodically the mixture in the column was homogenized with the help of an electrical hand massager, in order to remove possible air pockets. Sand and brine were added to completely fill the column to the level of the upper cap. The exact amounts of fluid and sand placed in the column were determined in each experiment. The column was oriented vertically and was connected at the bottom to a nitrogen cylinder via a gas flow controller pre-set at a flow rate of 60 cm$^3$/min. The valve at the bottom was slowly opened and liquid exiting the column at the top was collected into a tarred jar placed on a balance. Mass of collected fluid was recorded as a function of time by a computer running a data logging software. The experiments were conducted until no more brine could be displaced from the column. The total % of fluid recovered was then calculated.

For these experiments, complex nanofluid additives were prepared in the laboratory by mixing the selected terpene solvent, water, conventional nonionic surfactant with HLB>7, and ethoxylated and propoxylated alkylene or alkyl amine surfactant in ratios described above. All of these constituent components are commercially available from a variety of sources. Typically, the components were mixed together in the order: water, alcohol, nonionic surfactant, ethoxylated-propoxylated alkylene or alkyl amine, and lastly citrus terpene solvent. Other orders of addition are also suitable. The mixtures were then agitated on a magnetic stirrer for 5-10 minutes.

The complex nanofluid additives were then diluted to use concentrations of 1 or 2.0 gallons per 1000 gallons with 2% KCl brine and these diluted fluids were used in gas-oil and gas-brine displacement experiments described above. The selected concentrations are those typically suitable, but other concentrations can be used by those skilled in the art. In addition to the compositions of the present invention, several compositions of the prior art were also prepared. Notably, these prior art reference compositions did not contain the ethoxylated-propoxylated alkylene or alkyl amine component. The reference additives are presented in Table 1 below:

TABLE 1

| Reference Additives | |
|---|---|
| Reference complex nanofluid #1 (NF#1) | |
| Deionized water: | 11.9 wt % |
| Ethoxylated alcohol nonionic surfactant package | 75.1 wt % |
| co-solvent | 8.0 wt % |
| Citrus terpene: | 5.0 wt % |
| Reference complex nanofluid #2 (NF#2) | |
| Deionized water: | 15 wt % |
| Ethoxylated alcohol nonionic surfactant package | 36.4 wt % |
| Co-solvent | 26.5 wt % |
| Citrus terpene: | 22.1 wt % |
| Reference complex nanofluid #3 (NF#3) | |
| Deionized water: | 22.5 wt % |
| co-solvent | 35.1% |
| Pluronic ® surfactant | 13.5 wt % |
| Ethoxylated castor oil: | 13.5 wt % |
| Citrus terpene: | 15.4 wt % |

The complex nanofluid additives of the preferred embodiments were prepared according to the examples set forth in Table 2:

TABLE 2

| Inventive Complex Nanofluid Additives | |
|---|---|
| Example 1 | |
| Deionized water | 16.2 wt % |
| Ethoxylated alcohol surfactant package | 56.1 wt % |
| 2-propanol co-solvent | 11.5 wt % |
| Citrus terpene | 4.5 wt % |
| Ethylenediaminealcoxylate | 11.7 wt % |
| Example 2 | |
| Deionized water | 16.2 wt % |
| Ethoxylated alcohol surfactant package | 56.1 wt % |
| co-solvent | 11.5 wt % |
| Citrus terpene | 4.5 wt % |
| Diethylenetriaminealcoxylate | 11.7 wt % |
| Example 3 | |
| Deionized water | 6.4 wt % |
| Ethoxylated alcohol surfactant package | 60.1 wt % |
| co-solvent | 11.5 wt |
| Citrus terpene | 7 wt % |
| Ethylenediaminealcoxylate | 15 wt % |
| Example 4 | |
| Deionized water | 0.4 wt % |
| Ethoxylated alcohol surfactant package | 66.1 wt % |
| 2-propanol co-solvent | 11.5 wt % |
| Citrus terpene | 7 wt % |
| Ethylenediaminealcoxylate | 15 wt % |

Each of the reference additives and inventive additives were evaluated using the test protocols set forth above. The results of these experiments are summarized in Table 3 below as a percentage of the recovery of brine displacement by gas and brine displacement by oil. Each reference additive and inventive additive was utilized in a concentration range of between 1 gpt and 2 gpt.

TABLE 3

| Sample | Effectiveness of brine displacement by gas | Effectiveness of brine displacement by oil |
|---|---|---|
| Reference NF#1 1 gpt | 80% | 38% |
| Reference NF#2 2 gpt | 80% | 43% |
| Reference NF#3 1.5 gpt | 25% | 80% |
| Example 1 1 gpt | 75% | 88% |
| Example 2 1 gpt | 81% | 84% |
| Example 3 1 gpt | 59% | 88% |
| Example 4 1 gpt | 72% | 91% |

Based on the results summarized above, it is clear that Reference Additives Nos. 1 and 2 are well-suited for enhancing gas recovery but are not as effective for the recovery of liquid hydrocarbons. Reference Additive No. 3 performed well during the liquid recovery test but did not displace a significant percentage of hydrocarbons during the gas test. Thus, the reference formulations did not demonstrate an ability to effectively recover both liquid and gaseous hydrocarbons. In contrast, the inventive complex nanofluid additives demonstrated effective recovery of both liquid and gaseous hydrocarbons. The ability of these inventive formulations to enhance the recovery of both liquid and gaseous hydrocarbons represents a significant advancement over the prior art.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and as defined in the written description. For example, surfactant and surfactant mixture selections can be modified and changed to take into account varying reservoir conditions.

What is claimed is:

1. A method of treating a plurality of hydrocarbon-producing wells, wherein a first of the plurality of hydrocarbon-producing wells has a high gas-to-oil ratio and a second of the hydrocarbon-producing wells has a low gas-to-oil ratio, the method comprising the steps of:
   providing a complex nanofluid additive;
   emplacing the complex nanofluid additive into the first of the plurality of hydrocarbon-producing wells to lower the gas-to-oil ratio; and
   emplacing the complex nanofluid additive into the second of the plurality of hydrocarbon-producing wells to raise the gas-to-oil ratio.

2. The method of claim 1, wherein before the providing a complex nanofluid additive step, the method further comprises the steps of:
   providing a first surfactant and a second surfactant, wherein the second surfactant is selected from the group consisting of ethoxylated alkylene amines, ethoxylated alkyl amines, propoxylated alkylene amines, propoxylated alkyl amines, ethoxylated-propoxylated alkylene amines and ethoxylated-propoxylated alkyl amines;
   mixing the first surfactant with the second surfactant to form a surfactant mixture;
   adding a first solvent and a second solvent to the surfactant mixture to form a solvent-surfactant mixture;
   adding water to the solvent-surfactant mixture to form an emulsified solvent-surfactant mixture; and adding the emulsified-solvent surfactant mixture to a carrier fluid to form the complex nanofluid additive.

3. The method of claim 2, wherein the second surfactant is ethylenediaminealcoxylate.

4. The method of claim 2, wherein the second surfactant is diethylenetriaminealcoxylate.

5. The method of claim 2, wherein the first surfactant includes an ethoxylated alcohol.

6. The method of claim 5, wherein the first surfactant includes an ethoxylated alcohol having between 8 and 18 carbon atoms and between 5 and 20 moles of ethylene oxide.

7. The method of claim 2, wherein the second solvent is a co-solvent selected from the group consisting of short-chain alcohols and glycols.

8. The method of claim 2, wherein the complex nanofluid additive comprises:
- up to about 90% by volume of the first surfactant, wherein the first surfactant is selected from the group consisting of nonionic surfactants, cationic surfactants, and anionic surfactants;
- up to about 16% by volume of the second surfactant, wherein the second surfactant is selected from the group consisting of ethylenediaminealcoxylate and diethylenetriaminealcoxylate;
- up to about 10% by volume of the first solvent, wherein the first solvent is d-limonene; up to about 25% by volume of the second solvent, wherein the second solvent comprises a co-solvent or a mixture of co-solvents; and
- up to about 30% by volume water.

9. The method of claim 1, wherein before the providing a complex nanofluid additive step, the method further comprises the steps of:
providing a first surfactant and a second surfactant, wherein the second surfactant is selected from the group consisting of ethoxylated alkylene amines, ethoxylated alkyl amines, propoxylated alkylene amines, propoxylated alkyl amines, ethoxylated-propoxylated alkylene amines and ethoxylated-propoxylated alkyl amines;
mixing the first surfactant with the second surfactant to form a surfactant mixture;
adding a first solvent and a second solvent to the surfactant mixture to form a solvent-surfactant mixture; and
adding water to the solvent-surfactant mixture to form an emulsified solvent-surfactant mixture, wherein the emulsified solvent-surfactant mixture comprises a concentrated form of the complex nanofluid additive.

10. A method for increasing production of oil from a first well having a high gas-to-oil ratio and production of gas from a second well having a low gas-to-oil ratio, the method comprising the steps of:
providing a complex nanofluid additive;
emplacing the complex nanofluid additive into the first well; and
emplacing the complex nanofluid additive into the second well.

11. The method of claim 10, wherein before the providing a complex nanofluid additive step, the method further comprises the steps of:
providing a first surfactant and a second surfactant, wherein the second surfactant is selected from the group consisting of ethoxylated alkylene amines, ethoxylated alkyl amines, propoxylated alkylene amines, propoxylated alkyl amines, ethoxylated-propoxylated alkylene amines and ethoxylated-propoxylated alkyl amines;
mixing the first surfactant with the second surfactant to form a surfactant mixture;
adding a first solvent and a second solvent to the surfactant mixture to form a solvent-surfactant mixture;
adding water to the solvent-surfactant mixture to form an emulsified solvent-surfactant mixture; and
adding the emulsified-solvent surfactant mixture to a carrier fluid to form the complex nanofluid additive.

12. The method of claim 11, wherein the second surfactant is ethylenediaminealcoxylate.

13. The method of claim 11, wherein the second surfactant is diethylenetriaminealcoxylate.

14. The method of claim 11, wherein the first surfactant includes an ethoxylated alcohol.

15. The method of claim 11, wherein the first surfactant includes an ethoxylated alcohol having between 8 and 18 carbon atoms and between 5 and 20 moles of ethylene oxide.

16. The method of claim 11, wherein the second solvent is a co-solvent selected from the group consisting of short-chain alcohols and glycols.

17. The method of claim 11, wherein the complex nanofluid additive comprises:
- up to about 90% by volume of the first surfactant, wherein the first surfactant is selected from the group consisting of nonionic surfactants, cationic surfactants, and anionic surfactants;
- up to about 16% by volume of the second surfactant, wherein the second surfactant is selected from the group consisting of ethylenediaminealcoxylate and diethylenetriaminealcoxylate;
- up to about 10% by volume of the first solvent, wherein the first solvent is d-limonene; up to about 25% by volume of the second solvent, wherein the second solvent comprises a co-solvent or a mixture of co-solvents; and
- up to about 30% by volume water.

18. The method of claim 10, wherein before the providing a complex nanofluid additive step, the method further comprises the steps of:
providing a first surfactant and a second surfactant, wherein the second surfactant is selected from the group consisting of ethoxylated alkylene amines, ethoxylated alkyl amines, propoxylated alkylene amines, propoxylated alkyl amines, ethoxylated-propoxylated alkylene amines and ethoxylated-propoxylated alkyl amines;
mixing the first surfactant with the second surfactant to form a surfactant mixture;
adding a first solvent and a second solvent to the surfactant mixture to form a solvent-surfactant mixture; and
adding water to the solvent-surfactant mixture to form an emulsified solvent-surfactant mixture, wherein the emulsified solvent-surfactant mixture comprises a concentrated form of the complex nanofluid additive.

* * * * *